United States Patent Office 3,505,090
Patented Apr. 7, 1970

3,505,090
PROCESS FOR THE PRODUCTION OF CARBON ARTICLES
Peter H. Pinchbeck, Chesterfield, England, assignor to United Coke & Chemicals Company Limited, Treeton, England, a British company
No Drawing. Filed Jan. 10, 1967, Ser. No. 608,273
Claims priority, application Great Britain, Jan. 11, 1966, 1,298/66
Int. Cl. C08h 13/00, 17/02, 17/66
U.S. Cl. 106—284                                      10 Claims

ABSTRACT OF THE DISCLOSURE

In the production of a carbon electrode or other carbon article by baking a green compact of carbonaceous material with a binder of tar or pitch in order to carbonize the binder, polymerization of constituents during the baking is accelerated by a complex of zinc chloride and an organic base which remains stable during the production of the compact but is decomposed to yield zinc chloride during the baking. The complex may also be introduced into pitch used to impregnate a baked compact which is thereafter re-baked.

---

Articles composed essentially of carbon are commonly made by mixing particles of carbon in one of its forms with a carbonaceous binder and forming the mixture into a green compact. The carbon may be present in such forms as petroleum coke, coal coke, pitch coke, powdered graphite or carbon flour. The carbonaceous binder is tar or pitch derived from either petroleum or coal. These binders range from liquid or semi-liquid tars to solid pitches of high melting point.

When the compact has been made it is heated slowly to carbonize the binder. The greater the yield of carbon from the binder, the greater is the strength of the resulting bond between the carbon particles and also the density of the baked compact.

High strength and density are particularly important when the baked compact is subsequently graphitized by treatment at higher temperature. To reduce porosity and increase strength the baked compact is often impregnated further with pitch and then re-carbonized. In this case also it is desirable to obtain a high yield of carbon from the impregnant.

During the carbonizing process occluded gases, moisture and volatile materials are driven off from the tar or pitch. As the temperature is increased fission of chemical bonds occurs and the lighter fragments thus formed are lost. Products of higher molecular weight are formed by polymerization or by the linking of fragments produced by pyrolysis. The greater the loss of carbonaceous material during the carbonizing process, the less is the yield of carbon residue, and accordingly the less are the strength and density of the finished product. To reduce this loss, and to increase the formation of material of higher molecular weight, the use of polymerization agents in binders and impregnating pitches has received much study, and many substances have been suggested in the literature as suitable agents.

Of the various polymerization agents zinc chloride is the most effective and appreciably increases the carbon yield from a binder or impregnating pitch.

Unfortunately zinc chloride suffers from a disadvantage which has hitherto prevented the practical use of its property of increasing the carbon yield as shown by the coking value of the finished product. This disadvantage is that zinc chloride rapidly activates the polymerization, even at quite low temperature such as 80° C. Now in the mixing of the ingredients to form the green compact it is commonly necessary to heat the mixture to temperatures well above 80° C. in order to render the binder sufficiently fluid. The action of the zinc chloride at these temperatures results in a rapid rise in the viscosity of the binder, with the consequence that the wetting of the carbon particles by the binder is inadequate, and extrusion, tamping or similar operation to form the compact becomes difficult or even impossible.

In impregnating a baked compact with pitch, the compact is immersed in liquid pitch under pressure. The pitch must be hot (say at a temperature of 170° C.) and fluid in order to penetrate the baked compact, and if zinc chloride is added to the impregnating pitch the rise in viscosity severely reduces the efficiency of impregnation.

Thus if either a green compact is baked or an impregnated baked compact is re-baked, there is a carbonaceous body containing tar or pitch in which it is desirable that a polymerizing agent should be present without the disadvantage that arises when zinc chloride is added to the mix or the impregnating pitch. According to this invention zinc chloride is used as the polymerizing agent in the form of a complex with an organic base which will remain stable at the temperature encountered in mixing or impregnation, but will decompose at higher temperature. Broadly, the temperatures encountered range from 80° C. to 170° C., and it is desirable that the complex of zinc chloride should remain stable up to about 200° C. It should decompose at some temperature in the range of 200 to 350° C. We have found that so long as the zinc chloride is present as the complex it will not activate polymerization, but directly the complex decomposes it performs its normal function. Thus the final effect on the yield of carbon is similar to that when zinc chloride is added as such.

The preferred organic bases with which the zinc chloride complex is formed are pyridine and quinoline.

Broadly the complex may be added in amounts up to the equivalent of 5% zinc chloride by weight of the original mix.

The complex may be formed by simple reaction between zinc chloride and the organic base, and can be obtained in concentrated solution, for example in acetone or water, or as a dry powder by evaporating the solvent.

The complex may be introduced into the mixture that is carbonized in various ways. It is preferable to use it as a dry powder in order to avoid difficulty in driving off solvent during or after the production of the carbonaceous mixture. As a dry powder it may be incorporated in the binder, or may form one constituent of the initial mixture, or may be added to the green mixture when this is already hot. As a concentrated solution the complex may be added directly to the mix. The complex is best added to impregnating pitch as a solid powder. In every case it is important to obtain uniform distribution of the complex in the tar or pitch. Because impregnating pitches must be more fluid than binder tars or pitches, the complex should be introduced into impregnating pitch only just before this is used so as to avoid sedimentation, or the pitch and complex should be thoroughly mixed just before use.

Some examples will now be given.

EXAMPLE 1

A mix was formed of 8.8 parts of weight metallurgical coke, 92% of which was from 0.076 mm. to 1.2 mm. in size, the remainder consisting of smaller and larger particles, and 12 parts by weight of binder tar having an equiviscous temperature of 28° C and a coking value (as determined by the Alcan method of 27%. 2 parts by weight of a complex of zinc chloride and pyridine having the molecular formula $ZnCl_2(C_5H_5N)_2$ were incorporated as a powder in the binder tar, this being the equivalent of 1% zinc chloride based on the total weight of the coke and the binder. The mix was formed in molds into specimens 2 inches long and 2 inches in diameter by vibration while heated to 130° C., and the molded specimens were baked slowly at a rate of 2° C. per minute up to a temperature of 900° C. to carbonize the binder. The coking value of the carbonized binder was calculated and the density and compressive strength of the baked carbon products were determined. Similar specimens containing no complex were made, baked and tested. The average results obtained were as follows:

TABLE I

|  | Complex-free specimens | Complex-containing specimens |
| --- | --- | --- |
| Coking value, wt. percent | 39.0 | 52.3 |
| Baked density, g./cc | 1.31 | 1.34 |
| Compressive strength, p.s.i | 2,060 | 2,490 |

EXAMPLE 2

The process of Example 1 was repeated, except that the 12 parts of binder tar were replaced by 12 parts of binder pitch having a ring and ball softening point of 65° C. and an Alcan coking value of 42%, and that three further complexes were incorporated in this picth, each in parts by weight equivalent to 1% zinc chloride by weight. These were complexes of zinc chloride with quinoline (2.7 parts), hexamine (2.85 parts) and diethylamine (1.90 parts). The results of test on the carbon products were as follows:

TABLE II

|  | Complex-free specimens | Specimens containing complex of zinc chloride | | |
| --- | --- | --- | --- | --- |
|  |  | and Quinoline | and Hexamine | and Diethylamine |
| Coking value, wt. percent | 48.5 | 71.0 | 64.0 | 61.8 |
| Baked density, g./cc | 1.36 | 1.38 | 1.38 | 1.39 |
| Compressive strength, p.s.i | 2,960 | 4,880 | 4,230 | 4,100 |

EXAMPLE 3

A standard mix of calcined petroleum coke and electrode pitch was formed, 2% by weight of the complex of zinc chloride and pyridine being incorporated in the pitch. The mix was extruded hot into green electrodes 6 inches in diameter. Similar electrodes without any complex were also made. The green electrodes were all baked conventionally and the loss of weight during baking, the coking value and the apparent density of the baked electrodes in g./cc. were all determined. The average results obtained were as follows:

TABLE III

|  | Percent loss of weight on baking | Coking value, percent | Apparent density, g./cc. |
| --- | --- | --- | --- |
| Complex-free electrodes | 10.9 | 55 | 1.466 |
| Complex-containing electrodes | 7.9 | 67 | 1.566 |

On increasing the proportion of the complex, the coking value increases also, as is shown by Table IV, which relates to the complex of zinc chloride and pyridine incorporated in electrode pitch, and shows the coking values with amounts of the complex equivalent to different percentages of zinc chloride.

Table IV

| Equivalent amount of of $ZnCl_2$, wt. percent: | Alcan coking value, wt. percent |
| --- | --- |
| 0 | 50.8 |
| 0.5 | 58.4 |
| 1.0 | 62.5 |
| 2.2 | 64.0 |
| 3.7 | 68.4 |

The coking values obtained with the use of other complexes in electrode pitch, in each case in an amount equivalent to 3.7% zinc chloride, are given in Table V.

Table V

| Organic base of complex: | Alcan coking value, percent |
| --- | --- |
| Dimethyl-aniline | 68.5 |
| Diethylamine | 67.6 |
| N-dimethyl-benzylamine | 68.6 |
| Aniline | 64.9 |
| p-Toluidine | 68.5 |
| o-Toluidine | 69.5 |
| p-Phenylene diamine | 67.7 |
| Benzylamine | 69.0 |
| Benzidine | 66.4 |
| Quinoline | 67.0 |
| Urea | 67.5 |

Finally an example will be given of the production of a small graphite electrode by the method described and claimed in U.S. Patent 3,309,326, issued to H. L. Riley, and assigned to the assignee of the present application. First without any addition of zinc chloride, second with an addition of zinc chloride powder, and third with an addition of a complex of zinc chloride and pyridine.

Three mixes (in percentage by weight) were formed as follows:

|  | I | II | III |
| --- | --- | --- | --- |
| Calcined petroleum coke, percent | 54 | 53 | 51.84 |
| Atomised ferro-15% silicon, percent | 20 | 20 | 20 |
| Binder pitch (softening point 92° C. ring and ball), percent | 26 | 26 | 26 |
| Zinc chloride powder, percent |  | 1 [2] |  |
| Zinc chloride complex, percent |  |  | 2.16 |

[1] At high speed.
[2] Initially.

Each mix was blended in a hot mixer at 150° C. for 30 minutes, extruded, baked slowly to 900° C., and subsequently graphitized by heating at much higher temperature. Mixes I and III were extruded at 110° C. under a pressure of 1250 p.s.i. to give an extrusion rate of 9.5 inches per minute. It was impossible to extrude mix II at 110° C. at this pressure, but on increasing the pressure to 400 p.s.i. extrusion occurred at a rate of only 3.5 inches per minute. This fact shows that the zinc chloride in mix II had increased the viscosity of the pitch considerably, and under the high extrusion pressure required the extruded compact expanded on leaving the die and was mechanically weakened.

Specimens of the products both in the baked and graphitized states were tested for flexural, tensile and compressive strength, and the following figures, all in pounds per square inch, were obtained.

|   | Baked | | | Graphitised | | | Binder coking value, wt. percent |
|---|---|---|---|---|---|---|---|
|   | Flex. | Tensile | Comp. | Flex. | Tensile | Comp. | |
| I | 5,350 | 1,090 | 7,920 | 2,640 | 670 | 3,230 | 53.7 |
| II | 4,700 | 1,450 | 10,500 | 2,490 | 820 | 3,060 | 67.7 |
| III | 7,400 | 1,730 | 12,080 | 3,980 | 1,080 | 4,900 | 62.5 |

It will be seen that the zinc chloride powder did in fact lead to a good coking value, but not only necessitated the use of an excessive extrusion pressure but also led to a final graphitized product having strength values far lower than those obtained when the complex was used.

For the production of arc furnace electrodes or other bodies requiring the highest strength and least porosity, it is desirable to include a zinc chloride complex in the original mix and to impregnate the baked compact with pitch containing the same or another zinc chloride complex and re-bake the body.

I claim:
1. An improved process for the production of a carbon article by baking a mix comprising a carbonaceous body, a binding agent selected from the group consisting of tar and pitch, and zinc chloride as a polymerization agent, said baking being sufficient to carbonize said binding agent, the improvement which comprises:
   introducing the zinc chloride into the mix as a complex of zinc chloride and an organic base selected from the group consisting of dimethyl-aniline, diethyl-amine, N-dimethyl-benzylamine, aniline, p-toluidine, o-toluidine, p-phenylene diamine, benzylamine, benzidine, quinoline, urea, pyridine, and hexamine, said complex being stable at temperatures up to about 200° C., but decomposing upon heating to a temperature within the range of from about 200 to about 350° C., thereby yielding zinc chloride as a polymerization agent, said complex being present in an amount equivalent to about 5% by weight zinc chloride of the original mix.

2. The production of a carbon article according to claim 1 in which the organic base of the complex is selected from the group consisting of pyridine or quinoline.

3. The production of a carbon article according to claim 1 in which the complex is introduced as a dry powder.

4. The production of a carbon article according to claim 1 in which the complex is incorporated in the binder.

5. The production of a carbon article according to claim 1 in which the baked compact is impregnated with pitch and re-baked, and this pitch also contains zinc chloride complex as a polymerizing agent.

6. The production of a carbon article according to claim 1 in which the complex is introduced as a dry powder.

7. The process of claim 1 wherein said organic base is pyridine.

8. The process of claim 1 wherein said organic base is quinoline.

9. The process of claim 1 wherein said organic base is urea.

10. In the production of a carbon article as in claim 1, the steps of forming said mix into a green compact at a temperature in the range of 80° C. to 170° C. and baking the green compact to a high temperature to thereby carbonize the binder.

References Cited
UNITED STATES PATENTS

| 2,094,586 | 10/1937 | Craig | 208—296 |
| 2,527,596 | 10/1950 | Shea et al. | 106—56 |
| 2,864,760 | 12/1958 | Croy | 208—44 |
| 3,171,816 | 3/1965 | Peter et al. | 252—510 |
| 3,223,618 | 12/1965 | Convery et al. | 106—44 XR |
| 3,243,311 | 3/1966 | Rogers et al. | 106—280 |
| 3,373,101 | 3/1968 | Folkins et al. | 106—273 XR |

JULIUS FROME, Primary Examiner

J. B. EVANS, Assistant Examiner

U.S. Cl. X.R.

106—56; 252—510; 264—29, 105